United States Patent
Delsordo et al.

(10) Patent No.: US 11,824,908 B2
(45) Date of Patent: *Nov. 21, 2023

(54) PROVIDING SYNCHRONIZATION FOR VIDEO CONFERENCE AUDIO AND VIDEO

(71) Applicant: ARRIS ENTERPRISES LLC, Suwanee, GA (US)

(72) Inventors: Christopher S. Delsordo, Souderton, PA (US); Sadeesh Kumar Karuppiah, Bangalore (IN); Mallika Subramanyam, Warrington, PA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/978,432

(22) Filed: Nov. 1, 2022

(65) Prior Publication Data
US 2023/0063454 A1 Mar. 2, 2023

Related U.S. Application Data

(63) Continuation of application No. 17/469,057, filed on Sep. 8, 2021, now Pat. No. 11,522,929.

(Continued)

(51) Int. Cl.
*H04L 65/403* (2022.01)
*H04L 65/60* (2022.01)
*H04N 5/04* (2006.01)

(52) U.S. Cl.
CPC ............ *H04L 65/60* (2013.01); *H04L 65/403* (2013.01); *H04N 5/04* (2013.01)

(58) Field of Classification Search
CPC .......... H04L 65/60; H04L 65/403; H04N 5/04
See application file for complete search history.

(56) References Cited

U.S. PATENT DOCUMENTS

2005/0237378 A1  10/2005  Rodman
2006/0013565 A1*  1/2006  Baumgartner ... H04N 21/23418
                                                348/E7.024

(Continued)

FOREIGN PATENT DOCUMENTS

CN  109120882 A  1/2019
KR  20130030066 A  3/2013

OTHER PUBLICATIONS

Aggarwal, "Audio Signals: Comparison, "https://medium.com/@shivama205/audio-signals comparison-23e431ed2207, (Mar. 20, 2017, pp. 1-6.

(Continued)

*Primary Examiner* — Amal S Zenati
(74) *Attorney, Agent, or Firm* — Panitch Schwarze Belisario & Nadel LLC

(57) ABSTRACT

Technologies are disclosed for servicing a video conference by a media control device. The media control device may receive a first signal including a first audio component from a first device and a second signal including a second audio component from a second device. The media device may identify at least a first timestamp of the first signal and at least a first timestamp of the second signal. The media device may assign a common timestamp to the first signal and the second signal and modify the first signal and/or the second signal based, at least in part, on the common timestamp. The media device may send the modified first signal and/or the modified second signal to at least one recipient device.

24 Claims, 7 Drawing Sheets

Related U.S. Application Data

(60) Provisional application No. 63/128,323, filed on Dec. 21, 2020.

(56) References Cited

U.S. PATENT DOCUMENTS

| | | | | |
|---|---|---|---|---|
| 2009/0103897 | A1* | 4/2009 | Chen | H04N 9/8063 |
| | | | | 386/338 |
| 2012/0098923 | A1 | 4/2012 | Westin | |
| 2013/0342632 | A1 | 12/2013 | Su | |
| 2018/0115799 | A1* | 4/2018 | Thiele | G11B 27/28 |
| 2020/0265869 | A1* | 8/2020 | Werner | H04R 1/08 |

OTHER PUBLICATIONS

Crook, "Audacity," SourceForge, 2020 Slashdot Media, http://www.audacityteam.org/download/, pp. 1-2.

Drevo, "Audio Fingerprinting with Rython and Numpy," (Nov. 15, 2013), https://willdrevo.com/figerprinting-and-audio-recognition-with-python/, pp. 1-15.

Mel-frequency cepstrum—Wikipedia, (Dec. 8, 2020), https://en.wikipedia.org/wiki/Mel-frequency_cepstrum, pp. 1-4.

Nowak et al., "Methods of Sound Data Compression—Comparison of Different Standards, "CADSM 2011, (Feb. 23-25, 2011), Polyanna-Svalyava (Zakapattya), Ukraine, pp. 431-434.

"NTP Timestamp Calculations," from The Wizard of Oz, L. Frank Baum, Public transport in Oz, Last update May 26, 2012, https://www.eecis.udel.edu/~mills/time.html,pp. 1-4.

Notification of Transmittal of the International Search Report (Forms PCT/ISA/220 and PCT/ISA/210) and the Written Opinion of the International Searching Authority (Form PCT/ISA/237) dated Dec. 24, 2021, by the International Application Division Korean Intellectual Property Office in corresponding International Application No. PCT/US2021/049400 (9 pages).

* cited by examiner

PROVIDING SYNCHRONIZATION FOR VIDEO CONFERENCE AUDIO AND VIDEO

BACKGROUND

Media content (e.g., a form of more general electronic content) may be provided by a plurality of media content network operators to home and/or business subscribers/viewers. Media content network operators (e.g., cable network operators, or satellite operators, etc.) may provide subscribers/viewers with various forms of media content, such as movies, concerts, premium media content, broadcast media content, and/or pay-per-view (PPV) media content, and/or the like.

Media content network operators deploy consumer premises equipment (CPE) in residential and/or commercial environments, among other consumer environments, as part of the media content delivery network. The various CPE devices are activated and/or configured based on a variety of factors, such as consumer identities, subscriptions, and/or preferences, etc.

Consumers may use video conferencing applications for personal and/or business communication. The video conferencing can be greatly enhanced using devices that provide higher quality audio and/or video rendering capabilities such as CPE. CPE may offer the ability to connect to wireless devices over Wi-Fi™, for example. Wi-Fi™ video recording devices such as webcams, and/or the like, can record (e.g., high quality such as in media streaming devices (MSDs)) video and/or can send/transmit the (e.g., high quality) video to one or more CPEs for video conferencing, among other uses.

SUMMARY

A method for servicing a video conference performed by a media control device is disclosed. The method includes: receiving, by the media control device, a first signal including a first audio component from a first device, the first audio component representing at least some audio communication of a video conference; receiving, by the media control device, a second signal including a second audio component from a second device, the second audio component representing the at least some audio communication of the video conference; identifying, by the media control device, at least a first timestamp of the first signal; identifying, by the media control device, at least a first timestamp of the second signal; assigning, by the media control device, a common timestamp to the first signal and the second signal; modifying, by the media control device, the first signal and/or the second signal based, at least in part, on the common timestamp; and sending, by the media control device, the modified first signal and/or the modified second signal to at least one recipient device.

A media control device configured to service a video conference is disclosed. The media control device includes: a memory; a transceiver, the transceiver configured to communicate with at least a first device and a second device via at least one network; and a processor, the processor configured at least to: receive a first signal from the first device, the first signal including a first audio component, the first audio component representing at least some audio communication of the video conference; receive a second signal from the second device, the second signal including at least a second audio component, the second audio component representing the at least some audio communication of the video conference; identify at least a first timestamp of the first signal; identify at least a first timestamp of the second signal; assign a common timestamp to the first signal and the second signal; perform a modification on the first signal and/or the second signal based, at least in part, on the common timestamp; and send the modified first signal and/or the modified second signal to at least one recipient device.

A non-transitory computer readable medium having instructions stored thereon, the instructions causing at least one processor of a media control device to perform one or more operations. The one or more operations including: receiving a first signal from camera first device, the first signal including at least a first audio component, the first audio component representing at least some audio communication of a video conference; receiving a second signal from a second device, the second signal including at least a second audio component, the second audio component representing the at least some audio communication of the video conference; identifying at least a first timestamp of the first signal; identifying at least a first timestamp of the second signal; assigning a common timestamp to the first signal and the second signal; modifying the first signal based and/or the second signal, at least in part, on the common timestamp; and sending the modified first signal and/or the modified second signal to at least one recipient device.

Technologies are disclosed for servicing a video conference performed by a media control device. The media control device may be in communication with a camera device and a microphone device via at least one network. The camera device and the microphone device may be different devices. The media control device may be a set-top box, a home gateway, a mobile device, a media gateway, an Internet streaming device, a television, and/or a personal computing device, among other devices, for example.

The media control device may be configured to receive a first signal from the camera device. The first signal may include at least a video component and a first audio component. The first audio component may represent at least some audio communication of the video conference. The media control device may be configured to receive a second signal from the microphone device. The second signal may include at least a second audio component. The second audio component may represent the at least some audio communication of the video conference, for example.

The media control device may be configured to identify at least a first timestamp of the first signal and/or at least a first timestamp of the second signal. The media control device may be configured to modify the first signal based, at least in part, on the second signal and/or an adjusted first timestamp of the first signal. The media control device may be configured to send the modified first signal to at least one recipient device, for example.

In one or more scenarios, the media control device may be configured to measure a network transmission time of communication on the network between the media control device and the camera device. The media control device may be configured to calculate an average of the network transmission time over at least one time period, for example.

In one or more scenarios, the media control device may be configured such that the modification of the first signal may include ascertaining an adjustment time for the first signal. The adjustment time may be a difference between the first timestamp of the first signal and the average of the network transmission time, for example. The media control device may be configured to adjust at least the first timestamp of the first signal, for example based on the adjustment time. The media control device may be configured to buffer at least the first signal with the adjusted first timestamp, for example.

In one or more scenarios, the media control device may be configured to replace the first audio component with the second audio component in the buffered first signal with the adjusted first timestamp, for example based, at least in part, on the first timestamp of the second signal and/or an adjusted first timestamp of the second signal.

In one or more scenarios, the media control device may be configured to sample the first audio component. The media control device may be configured to compare the first audio component with the second audio component, for example based, at least in part, on the sample. The media control device may be configured to align the second audio component with the first audio component, for example based, at least in part, on the comparison. The media control device may be configured to replace the first audio component with the aligned second audio component in the buffered first signal with the adjusted first timestamp, for example based, at least in part, on the first timestamp of the second signal and/or an adjusted first timestamp of the second signal.

In one or more scenarios, the media control device and the at least one recipient device may be at least two devices servicing the video conference. The media control device may be configured to ascertain a video format of the video conference. The media control device may be configured to ascertain a buffer size for the first signal with the first timestamp, the first signal with the adjusted first timestamp, the second signal with the first timestamp, and/or the second signal with an adjusted first timestamp, for example based, at least in part, on the video format of the video conference. The media control device may be configured to provide the modified first signal in the video format of the video conference.

In one or more scenarios, the camera device may be a webcam digital camera device, and/or a stand-alone digital camera device, for example. The microphone device may be a far field microphone device, a noise-cancelling microphone device, a shotgun microphone device, a dynamic microphone device, a ribbon microphone device, a large size diaphragm microphone device, and/or a small diaphragm microphone device, for example.

BRIEF DESCRIPTION OF DRAWINGS

The elements and other features, advantages and disclosures contained herein, and the manner of attaining them, will become apparent and the present disclosure will be better understood by reference to the following description of various examples of the present disclosure taken in conjunction with the accompanying drawings, wherein.

DETAILED DESCRIPTION

Figure 1:
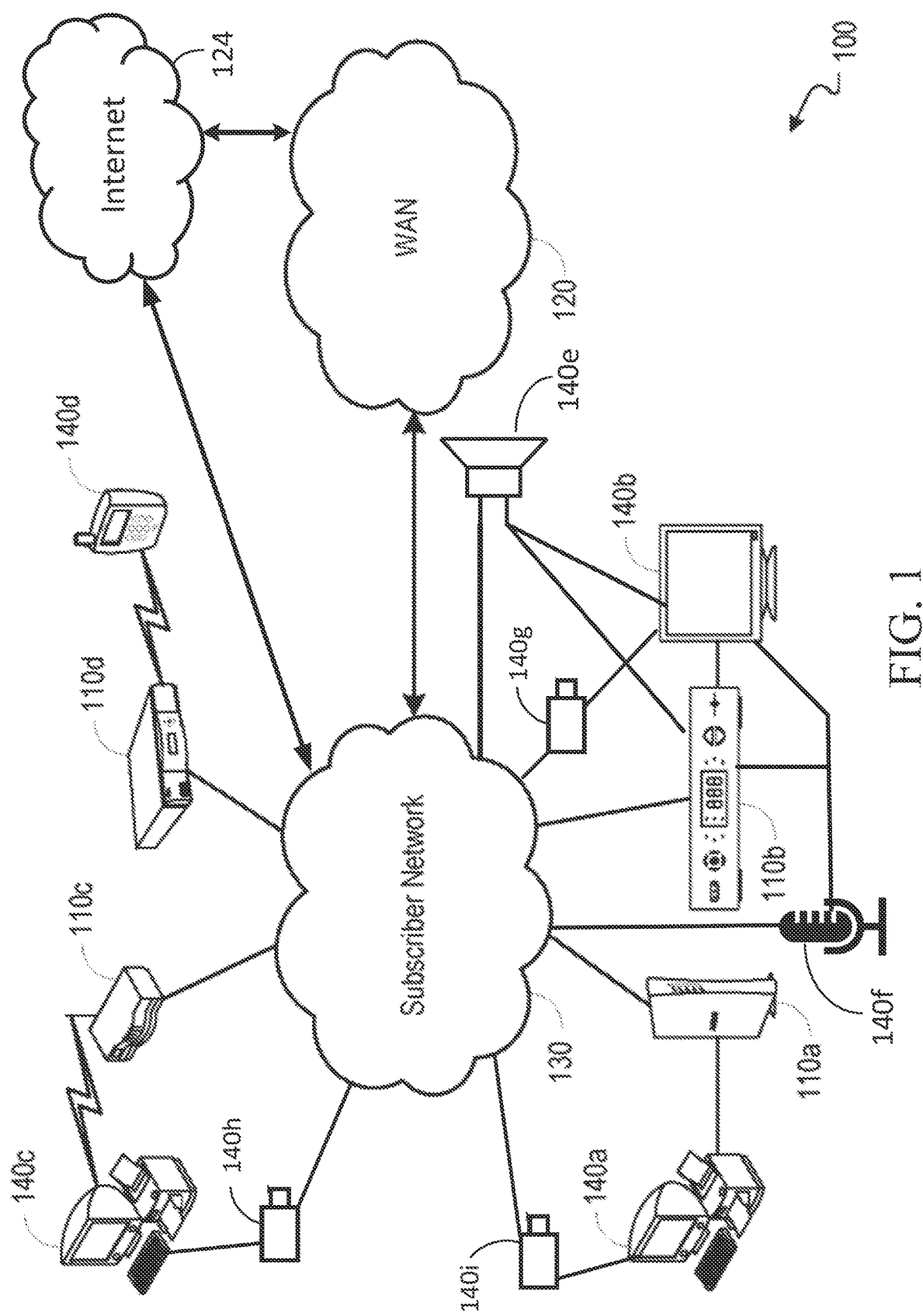
FIG. 1 is a block diagram illustrating an example network environment operable to deliver electronic content throughout the network via one or more network devices, such as a consumer premises device (CPE) device, among other devices.

For the purposes of promoting an understanding of the principles of the present disclosure, reference will now be made to the examples illustrated in the drawings, and specific language will be used to describe the same. It will nevertheless be understood that no limitation of the scope of this disclosure is thereby intended.

FIG. 1 is a block diagram illustrating an example network environment 100 operable for electronic content delivery. Electronic content may include media content, electronic documents, device-to-device communications, Internet/cloud-based electronic applications/services/databases, electronic communications/services (e.g., video/audio conferencing), Internet-based electronic services, electronic commerce, video components/elements of electronic content, and/or audio components/elements of electronic content, among other types of electronic content.

A media content delivery network operator, or MSO, may deliver media content to subscribers/viewers. Media content may be provided via a consumer premise equipment (CPE) and/or network gateway device supported by the MSO, for example. In one or more scenarios, CPE devices 110a-d receive video service(s) and/or data service(s) from a wide area network (WAN) 120 via a connection to a subscriber network 130. The one or more nodes of subscriber network 130 and/or the WAN 120 may communicate with one or more cloud-based nodes (not shown) via the Internet 124. The subscriber network 130 and/or WAN 120 may include a home gateway (not shown), that may be used to implement set-top box functionality, among other functions.

The CPE devices can include, for example, a modem 110a, a set-top box 110b, a wireless router including an embedded modem 110c, or a media gateway 110d, among many others (e.g., digital subscriber line (DSL) modem, voice over internet protocol (VOIP) terminal adapter, video game console, digital versatile disc (DVD) player, communications device, hotspot device, etc.). The subscriber network 130, for example, can be a hybrid fiber-coaxial (HFC) network, a local area network (LAN), a wireless local area network (WLAN), a cellular network, a personal area network (PAN), as well as others.

The CPE devices can facilitate communications between the WAN 120 and client devices 140a-140i. A cable modem or embedded MTA (eMTA) 110 a can facilitate communications between the WAN 120 and a computer 140a. A set-top box 110b can facilitate communications between the WAN 120 and a television/monitor 140b (e.g., a media presentation device) and/or a digital video recorder (DVR). A wireless router 110c can facilitate communications between a computer 140c and the WAN 120. The media gateway 110d can facilitate communications between a mobile device 140d (e.g., a tablet computing device, a smartphone, a personal digital assistant (PDA) device, a laptop computing device, etc.; one or more devices being PC-based, iOS-based, Linux-based, and/or Android-based, etc.) and the WAN 120. One or more speaker devices (e.g., sound radiation devices/systems) 140e may be in communication with the Subscriber Network 130, set-top box 110b, and/or television 140b, etc. Camera devices 140g, 140h, and/or 140i may be in communication with the computer 140a, the television 140b, the computer 140c, and/or the Subscriber Network 130, for example, among other devices and networks.

The one or more speaker devices 140e (e.g., surround sound speakers, home theater speakers, other external wired/wireless speakers, loudspeakers, full-range drivers, sub-woofers, woofers, mid-range drivers, tweeters, coaxial drivers, etc.) may broadcast at least an audio component of electronic content/media content, among other audio signals/processes/applications. The one or more speaker devices 140e may possess the capability to radiate sound in pre-configured acoustical/physical patterns (e.g., a cone pattern, a directional pattern, etc.)

One or more microphone devices 140f may be external/standalone microphone devices. The one or more microphone devices 140f may be in communication with the Subscriber Network 130, set-top box 110b, television 140b, computer 140a, computer 140c, mobile device 140a, etc. Any of the client devices 140a-140i may include internal microphone devices. The one or more speaker devices 140e (e.g., "speakers") and/or the one or more microphone devices 140f (e.g., "microphones", that may be "high quality" devices such as far field microphones, noise-cancelling microphones, shotgun microphones, dynamic microphones, ribbon microphones, and/or various size diaphragm microphones, Bluetooth™-based remote/control devices, RF4CE-based remote/control devices, etc.) may have wired and/or wireless connections (e.g., Bluetooth, Wi-Fi, private protocol communication network, etc.) to any of the other devices 140a-140i, the Subscriber Network 130, the WAN 120, and/or the Internet 124.

The camera devices 140g-140i may provide digital video input/output capability for one or more of the devices 110a-110d and/or devices 140a-140d. The camera devices 140g-140i may communicate with any of the devices 110a-110d and/or devices 140a-140f, perhaps for example via a wired and/or wireless connection. One or more of the camera devices 140g-140i may capture digital images and/or may scan images of various kinds, such as Universal Product Code (UPC) codes and/or Quick Response (QR) codes, for example, among other images. One or more of the camera devices 140g-140i may provide for video input/output for video conferencing (e.g., may serve as webcams or the like), for example, among other video functions.

Any of the camera devices 140g-140i may include microphone devices and/or speaker devices. The input/output of any of the camera devices 140g-140i may include audio signals/packets/components, perhaps for example separate/separable from, or in some (e.g., separable) combination with, the video signals/packets/components of any of the camera devices 140g-140i.

One or more of the camera devices 140g-140i may detect the presence of one or more people that may be proximate to the camera devices 140g-140i and/or that may be in the same general space (e.g., the same room) as the camera devices 140g-140i. One or more of the camera devices 140g-140i may gauge a general activity level (e.g., high activity, medium activity, and/or low activity) of one or more people that may be detected by the camera devices 140g-140i. One or more of the camera devices 140g-140i may detect one or more general characteristics (e.g. height, body shape, skin color, pulse, heart rate, breathing count, etc.) of the one or more people detected by the camera devices 140g-140i. One or more of the camera devices 140g-140i may be configured to recognize one or more specific people, for example.

One or more of the camera devices 140g-140i may be use wireless communication with any of the devices 110a-110d and/or 140a-140d, such as for example Bluetooth™ and/or Wi-Fi™, among other wireless communication protocols.

One or more of the camera devices 140g-140i may be external to any of the devices 110a-110d and/or devices 140a-140d. One or more of the camera devices 140g-140i may be internal to any of the devices 110a-110d and/or devices 140a-140d.

A user (not shown) may monitor (e.g., watch and/or listen to) and/or create media content and/or more generally interact with various kinds of electronic content on/from/via one or more of the devices 110a-110d and/or 140a-140i, among other devices (not shown), for example. The electronic content may be encrypted via one or more encryption techniques, such as symmetrical and/or asymmetrical encryption. Any of the devices 110a-110d and/or 140a-140i may utilize one or more digital certificates to initiate, and/or engage in, encrypted communication to obtain, interact, and/or monitor electronic content that may be conveyed via the Internet 124, the WAN 120, and/or the Subscriber Network 130, etc., for example.

For example, a CPE device, such as a set-top box 110b and/or any of the devices 110a-110d and/or 140a-140i, may be used to receive service from a network services provider. For various reasons, perhaps for example when a consumer engages a network services provider for a new/fresh service and/or a change in an existing service, and/or perhaps when a CPE device may be replaced (e.g., for maintenance, upgrade, etc.), one or more consumer profiles may be implemented on the CPE device (e.g., may need to be implemented).

At times, and for various reasons, personal and/or business meetings/conferences may be conducted via one or more video conferencing technical modalities. In one or more scenarios, a video conference participant (e.g., one or more people that may be physically situated in the same room/location, etc.) may use a webcam device or other (e.g., stand-alone) digital camera device to convey/transmit/send the video images/components/packets/communication of the camera device signal to the one or more other video conference participants (e.g., via a network and/or the Internet).

The audio components/packets/communication of the video conference may be conveyed/transmitted/sent to the one or more other video conference participants. The audio communication of the video conference may be captured by one or more microphones that may be part of/integrated with the webcam device and/or the other digital camera device. Often, the microphone devices integrated with the webcam devices and/or the other digital camera devices may be of (e.g., very) low quality. Video conference participants may wish to use/rely on microphone devices that demonstrate greater audio quality in the capture and/or transmission of audio communication, especially compared to the microphone devices that may be integrated with webcam devices and/or other digital camera devices.

Using current methods and/or devices, video conference participants might not be able to use a (e.g., high quality) microphone device to convey the audio components of a video conference call, perhaps for example instead of relying on/using a microphone that may be part of a webcam device that may be used to convey the video components of the video conference.

In one or more scenarios, video conference participants may wish to use the video capability of the webcam devices and/or other digital camera devices to convey the video communication of a video conference, perhaps for example while using a different, higher quality, microphone device to convey the audio communication of a video conference. For example, devices such as smart media devices (SMDs)

might have microphones (e.g., high quality microphones). In such scenarios, among others, it is a technological challenge to synchronize the audio and the video captured/recorded from different devices prior to transmitting the combined audio and video to other devices (e.g., to one or more devices of other participants on the video conference/video conference call).

Technologies that may provide video conference participants an ability to replace an audio component of a webcam device signal with an audio component provided by a different microphone device may be useful. Capabilities, techniques, methods, and/or devices described herein may at least facilitate the replacement/substitution/alignment/synchronization of an audio component of a webcam device signal with an audio component of a microphone device signal, for example during a video conference, among other scenarios.

Figure 6:
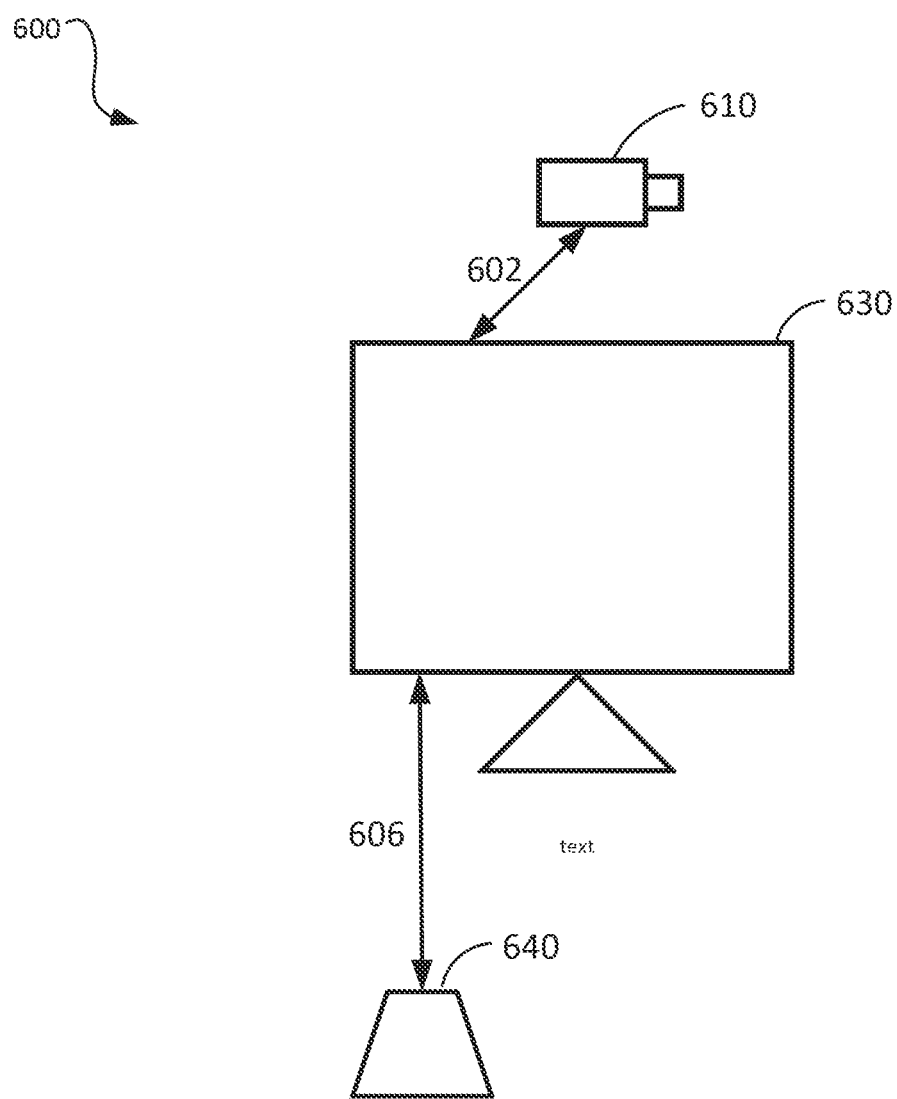
FIG. 6 is a diagram of at least one example technique for servicing a video conference.
Figure 7:
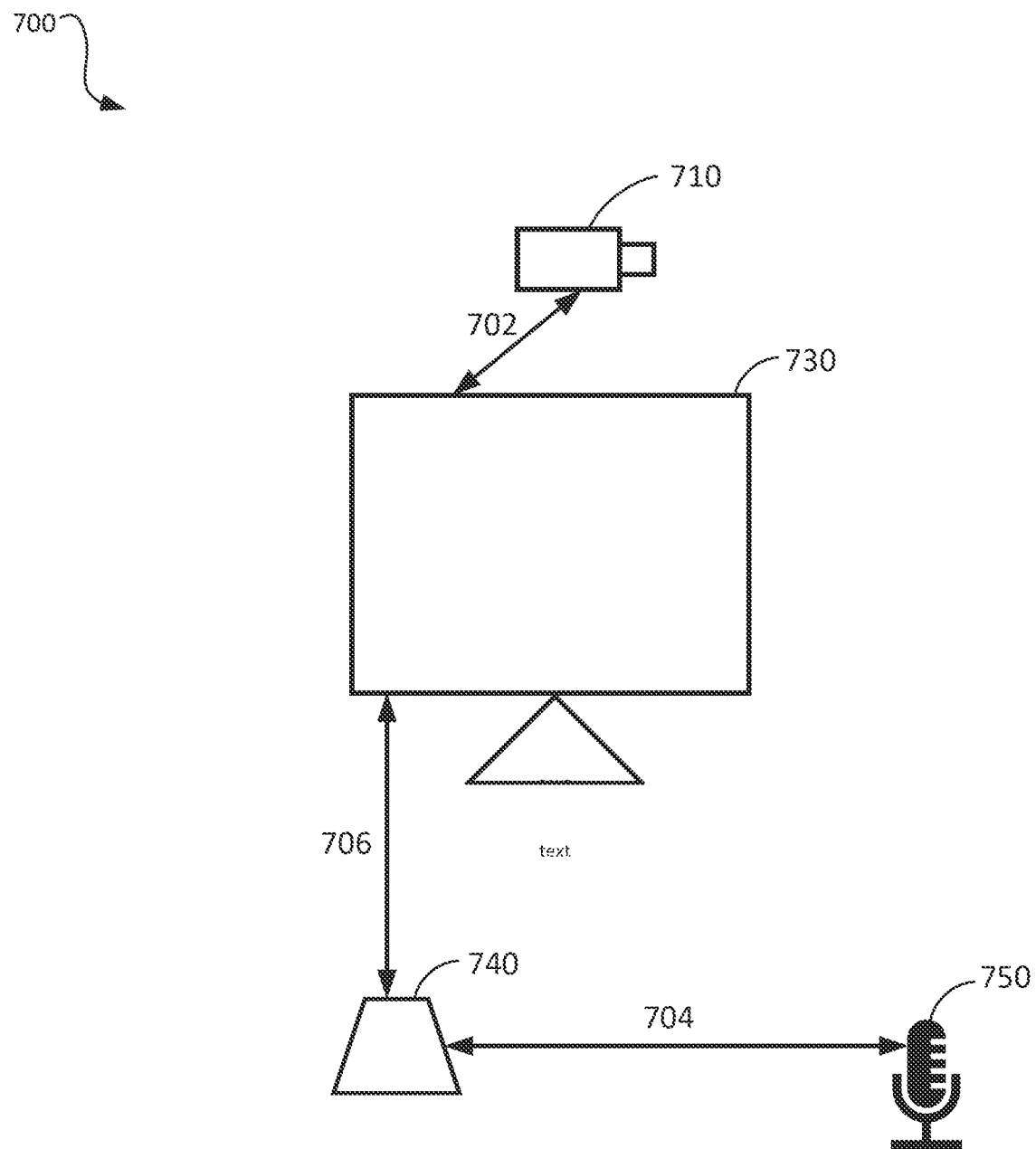
FIG. 7 is a diagram of at least one example technique for servicing a video conference.

In one or more scenarios, any of the devices 110a-110d, 140a-140i, and/or Internet streaming device 640 of FIG. 6 and/or Internet streaming device 740 of FIG. 7, among other devices, may be used by one or more video conference participants to implement any of the capabilities, techniques, methods, and/or devices described herein.

The WAN network 120 and/or the Subscriber Network 130 may be implemented as any type of wired and/or wireless network, including a local area network (LAN), a wide area network (WAN), a global network (the Internet), etc. Accordingly, the WAN network 120 and/or the Subscriber Network 130 may include one or more communicatively coupled network computing devices (not shown) for facilitating the flow and/or processing of network communication traffic via a series of wired and/or wireless interconnects. Such network computing devices may include, but are not limited, to one or more access points, routers, switches, servers, computing devices, and/or storage devices, etc.

Figure 2:
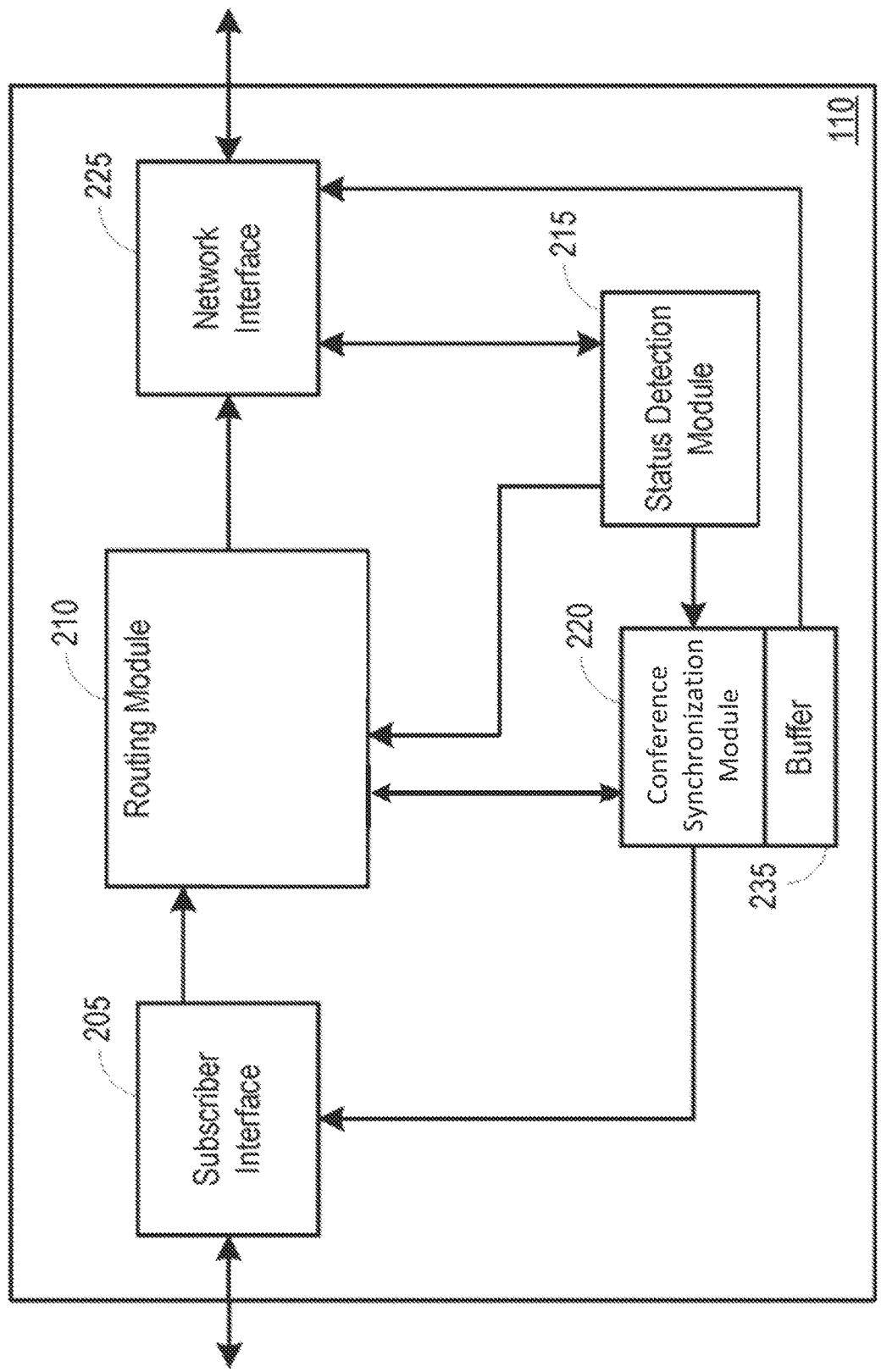
FIG. 2 is a block diagram illustrating an example CPE device of FIG. 1 that may be configured to deliver electronic content to a subscriber.

FIG. 2 is a block diagram illustrating an example CPE device 110 (e.g., any of the devices 110a-110d and/or Internet streaming devices 640 of FIG. 6 and/or 740 of FIG. 7) operable to output audio/visual electronic content/media content, and/or receive same, to/from one or more devices, such as for example, the television/monitor 140b, mobile device 140d, computer 140c, computer 140a, one or more speaker devices 140e, one or more microphone devices 140f, and/or camera devices 140h-140i, etc. The CPE device 110 can include a subscriber interface 205, a routing module 210, a status detection module 215, a conference synchronization module 220, and/or a network interface 225.

In one or more scenarios, the CPE device 110 may receive a communication from a subscriber or subscriber device (e.g., subscriber device 140a-140i of FIG. 1). For example, the communication can be a request for data and/or a service from a network (e.g., WAN 120 of FIG. 1). A communication received from a subscriber or subscriber device can be received as a resource identifier (e.g., URL, and/or an IP address, and/or other formats).

In one or more scenarios, a routing module 210 may route a received communication to a network interface 225. The routing module 210 may route the communication to the network interface 225. The routing module may translate the received communication from a URL to an IP address.

In one or more scenarios, a media control device (e.g., set-top box 110b and/or any of the devices 110a-110d and/or 140a-140i, and/or Internet streaming device 640 of FIG. 6 and/or Internet streaming device 740 of FIG. 7) and/or its conference synchronization module 220 may be configured to service one or more video conferences. The media control device and/or its conference synchronization module 220 may provide for a video conference participant to use the video capability of a camera device (e.g., that might not have an integral/associated high-quality microphone device) along with the capability of a high-quality microphone device to convey the video participant's audio communication and video communication of the video conference to one or more other video conference participants, for example.

Stated somewhat differently, the media control device and/or its conference synchronization module 220 may be configured to synchronize the recorded/buffered and/or real time video communication/content and audio communication/content that may be sourced/captured from different devices. In one or more scenarios, a common timestamp may be assigned to the camera device output and the microphone device output. The audio-visual content that may be sourced from/captured by different devices may be aligned/synchronized. The aligned/synchronized audio content and video content may be repackaged into an (e.g., defined) audio-visual transport format for the video conference transmission.

Without the capabilities, techniques, methods, and/or devices described herein, the skilled artisan would not appreciate how to arrange synchronization of the audio and the video recorded from different devices prior to transmitting such audio and video to participants of the video conference. For example, as separate devices may be used to capture the video communication and the audio communication of the video conference, absent the capabilities, techniques, methods, and/or devices described herein, the transmitted/captured audio and video would lack synchronization, for example at/after transmission to video conference participants.

In one or more scenarios, the conference synchronization module 220 of a media control device may be configured to service a video conference. The media control device may be in communication with a camera device and a microphone device via at least one network, for example. The camera device and the microphone device may be different devices. In one or more scenarios, the camera device and the microphone device may be part of different devices, perhaps for example at different locations within the same viewing area, among other scenarios. For example, the media control device may be a set-top box such as device 110b, among other devices 110a-110d and/or 140a-140i, and/or Internet streaming devices 640 and/or 740, for example.

The conference synchronization module 220 may be configured to receive a first signal from the camera device. The first signal may include at least a video component/packets and a first audio component/packets. The first audio component may represent at least some audio communication of the video conference. The first video component may represent at least some video communication of the video conference.

The conference synchronization module 220 may be configured to receive a second signal from the microphone device. The microphone device might be of a (e.g., relatively) higher audio output quality (e.g., far field microphone, etc.) compared to the microphone forming part of the camera device, may be in a better location, may have noise cancellation, and/or may have one or more other mechanism(s) that may generally make the microphone device have (e.g., relatively) better sound quality. The second signal may include at least a second audio component. The second audio component may represent the at least some audio communication of the video conference, for example in a common location such as in the same room, among other scenarios.

The conference synchronization module 220 may be configured to identify at least a first timestamp of the first signal and/or identify at least a first timestamp to the second signal (e.g., as the video communication and audio communication are being captured and/or recorded/buffered). In one or more scenarios, a network time protocol (NTP) server and/or another local time source may be used for the timestamping, for example.

NTP is a networking protocol for clock synchronization between computer systems over packet-switched, variable-latency data networks. NTP may be used to synchronize one or more, or all, networked computers, perhaps for example to within a few milliseconds of Coordinated Universal Time (UTC). NTP may maintain time to within tens of milliseconds over the Internet, for example.

In one or more scenarios, the at least first timestamp of the first signal may be assigned by the camera device, perhaps for example as camera device captures/records the audio communication and the video communication of the video conference. In one or more scenarios, the at least first timestamp of the first signal may be assigned by the camera device, perhaps for example as the camera device outputs the first signal of the captured/recorded audio communication and the video communication of the video conference. In one or more scenarios, the at least first timestamp of the first signal may be assigned by the media control device, perhaps for example upon receipt of the captured/recorded audio communication and the video communication of the video conference from the camera device.

In one or more scenarios, the at least first timestamp of the second signal may be assigned by the microphone device, perhaps for example as the microphone device captures/records the audio communication of the video conference. In one or more scenarios, the at least first timestamp of the second signal may be assigned by the microphone device, perhaps for example as microphone device outputs the second signal of the captured/recorded audio communication of the video conference. In one or more scenarios, the at least first timestamp of the second signal may be assigned by the media control device, perhaps for example upon receipt of the captured/recorded audio communication of the video conference from the microphone device.

The conference synchronization module 220 may be configured to modify the first signal, perhaps for example based, at least in part, on the second signal and/or an adjusted first timestamp of the first signal, or vice versa. The conference synchronization module 220 may be configured to send the modified first signal to at least one recipient device (e.g., one or more other devices that may be servicing the video conference).

In one or more scenarios, the conference synchronization module 220 may be configured to measure a network transmission time of communication on the at least one network between the media control device and the camera device. The conference synchronization module 220 may be configured to calculate/ascertain an average of the network transmission time over one or more time periods. In one or more scenarios, the conference synchronization module 220 may be configured to calculate/ascertain a rolling average, a historical average, and/or other specified averages, etc., for one or more time periods. In one or more scenarios, at least some of this information may be used to align the recorded/captured/buffered video communication with the microphone device recorded/captured/buffered audio communication in preparation for sending/providing the modified first signal (e.g., camera device output) content to one or more other participants of the video conference/video conference call.

The conference synchronization module 220 may be configured to (e.g., periodically, continuously, and/or conditionally, etc.) monitor/measure the network transmission/communication time/delay (e.g., one way communication and/or round-trip communication) between the media control device and the camera device and/or the microphone device, for example. At least one format for the measured network transmission/communication time/delay may be in secs:fractionOfSeconds, among other formats, for example. The network transmission/communication time/delay may be stored separate from, and/or with, the local time. In one or more scenarios, a network "ping" and/or a test message may be used to measure the network transmission/communication time/delay, among other techniques, for example.

Table 1 illustrates an example listing of continuous network round-trip transmission/communication time/delay measurements/monitoring between an example media control device and an example camera device (e.g., connected on a network via Wi-Fi™)

TABLE 1

Example Continuous Network Round-Trip Communication Time Measurements

Local Time Jan 21 2020:8 Hours:10Min:13seconds:100millisecs → transmission time 25ms
Local Time Jan 21 2020:8 Hours:10Min:15seconds:100millisecs → transmission time 23ms
Local Time Jan 21 2020:8 Hours:10Min:17seconds:100millisecs → transmission time 29ms
Local Time Jan 21 2020:8 Hours:10Min:19seconds:100millisecs → transmission time 27ms
Local Time Jan 21 2020:8 Hours:10Min:21seconds:100millisecs → transmission time 24ms In one or more scenarios, the conference synchronization module 220 may be configured to ascertain an adjustment time for the first signal. The adjustment time may be a difference between the first timestamp of the first signal and the average, rolling average, historical average, and/or other specified average, etc., of the network transmission time for communication between the media control device and the camera device, for example, among other values. In one or more scenarios, the communication delay may be measured between the devices, for example, the delay with respect to a microphone device relative to a media control device (e.g., a media control device that may house the camera device), or other devices that may perform the synchronization described herein. At least the first timestamp of the first signal may be adjusted based on the adjustment time for the first signal. In one or more scenarios, at least the first signal with the adjusted first timestamp may be buffered, for example, among other signals. Such adjustments of the first signal timestamp may be useful in scenarios in which the network transmission/communication between the media control device and the camera device may experience relatively material latency/delay (e.g., Bluetooth™ and/or Wi-Fi™ connections, etc.).

Table 2 illustrates an example listing of timestamped data of an example first signal between an example camera device (e.g., connected on a network via Wi-Fi™) and an example media control device. The example media control device and/or the example camera device may process an NTP and/or local timestamp such that the time may be in date:hour:second:fraction of seconds, for example. The timestamp may be applied/assigned by the example camera device during the receipt/recording/buffering of the first signal by the media control device. The timestamp may be provided by the example camera device perhaps for example along with first signal video data/component and audio data/component.

TABLE 2

Example of Camera Device Audio and Video Data as Timestamped

Recorded Video Buffer Id 1 recorded at Local Time Jan 21 2020:8 Hours:10Min:15seconds:225millisecs
Recorded Video Buffer Id 2 recorded at Local Time Jan 21 2020:8 Hours:10Min:16seconds:325millisecs
Recorded Video Buffer Id 3 recorded at Local Time Jan 21 2020:8 Hours:10Min:17seconds:425millisecs
Recorded Video Buffer Id 4 recorded at Local Time Jan 21 2020:8 Hours:10Min:18seconds:525millisecs
Recorded Video Buffer Id 5 recorded at Local Time Jan 21 2020:8 Hours:10Min:19seconds:625millisecs Table 3 illustrates an example of an adjustment of at least the example camera device first signal video data components of Table 2, based for example on a 25 millisecond average of the network transmission/communication delay/time data of Table 1.

TABLE 3

Example of Camera Device Audio and Video Data with Adjusted Timestamps

Recorded Video Buffer Id 1 recorded at Local Time Jan 21 2020:8 Hours:10Min:15seconds:200millisecs
Recorded Video Buffer Id 2 recorded at Local Time Jan 21 2020:8 Hours:10Min:16seconds:300millisecs
Recorded Video Buffer Id 3 recorded at Local Time Jan 21 2020:8 Hours:10Min:17seconds:400millisecs
Recorded Video Buffer Id 4 recorded at Local Time Jan 21 2020:8 Hours:10Min:18seconds:500millisecs
Recorded Video Buffer Id 5 recorded at Local Time Jan 21 2020:8 Hours:10Min:19seconds:600millisecs In one or more scenarios, the conference synchronization module 220 may be configured to ascertain an adjustment time for the second signal. The adjustment time may be a difference between the first timestamp of the second signal and the average and/or rolling average of the network transmission time for communication between the media control device and the microphone device, for example, among other values. At least the first timestamp of the second signal may be adjusted based on the adjustment time for the second signal. In one or more scenarios, at least the second signal with the adjusted first timestamp may be buffered, for example, among other signals. Such adjustments of the second signal timestamp may be useful in scenarios in which the network transmission/communication between the media control device and the microphone device may experience relatively material latency/delay (e.g., Bluetooth™ and/or Wi-Fi™ connections, etc.).

In one or more scenarios, the conference synchronization module 220 may be configured to replace the first audio component with the second audio component, perhaps for example, in the buffered first signal with the adjusted first timestamp, based, at least in part, on the first timestamp of the second signal and/or an adjusted first timestamp of the second signal (e.g., remove/replace the first audio component packets with the second audio component packets with the same and/or substantially similar local timestamps/adjusted timestamps).

Table 4 illustrates an example of second signal data provided/captured/recorded by an example microphone device (e.g., connected on a network via HDMI) to the example media control device. The example media control device may take the (e.g., high quality) audio data from the example microphone device with the same, and/or substantially similar, NTP and/or local timestamp and may replace the example camera device's audio content at the same, and/or substantially similar, adjusted NTP and/or local timestamp location of the example camera device's video data. The modified example camera device's output may be sent to the at least one recipient device.

TABLE 4

Example of Microphone Device Audio Data as Timestamped

Recorded Audio Buffer Id 1 recorded at Local Time Jan 21 2020:8 Hours:10Min:15seconds:200millisecs
Recorded Audio Buffer Id 2 recorded at Local Time Jan 21 2020:8 Hours:10Min:16seconds:300millisecs
Recorded Audio Buffer Id 3 recorded at Local Time Jan 21 2020:8 Hours:10Min:17seconds:400millisecs
Recorded Audio Buffer Id 4 recorded at Local Time Jan 21 2020:8 Hours:10Min:18seconds:500millisecs
Recorded Audio Buffer Id 5 recorded at Local Time Jan 21 2020:8 Hours:10Min:19seconds:600millisecs In one or more scenarios, the conference synchronization module 220 may be configured to sample the first audio component of the first signal (e.g., locally generated samples thereof). The first audio component may be compared with the second audio component of the second signal (e.g., locally generated samples thereof), perhaps for example based, at least in part, on the sample/sampling. For example, the comparison may be way of similarity in content, such as by comparing the similarity of audio samples and/or audio fingerprinting, among other techniques. The second audio component may be aligned with the first audio component, perhaps for example based, at least in part, on the comparing/comparison.

In one or more scenarios, the conference synchronization module 220 may be configured to remove/replace the first audio component with the aligned second audio component in the (e.g., buffered) first signal with the adjusted first timestamp, perhaps for example based, at least in part, on the first timestamp of the second signal and/or the adjusted first timestamp of the second signal (e.g., remove/replace the first audio component packets with the second audio component packets with the same and/or substantially similar local timestamps/adjusted timestamps). Such sampling-and-comparison-based removal/replacement may provide for a more accurate, better aligned, synchronization of the video component of the first signal and the second audio component of the second signal, for example.

For example, audio comparison might measure the relative degree of similarity based of some characteristics between first audio component with the aligned second audio component by generating fingerprints from audio files and compare them. Fingerprint generation in audio files can be done using known algorithms such as Echoprint™, Chromaprint™, etc. See, e.g., https://medium.com/@shivama205/audio-signals-comparison-23e431ed2207. But other techniques are possible, such as the mel-frequency cepstrum (MFC) sound processing, which is a representation of the short-term power spectrum of a sound, based on a linear cosine transform of a log power spectrum on a nonlinear mel scale of frequency, such as disclosed in https://en.wikipedia.org/wiki/Mel-frequency_cepstrum. Still other programs are available such as Audio DiffMaker, a freeware tool set intended to help determine the absolute difference between two audio recordings, while neglecting differences due to level difference, time synchronization, or simple linear frequency responses. This non-limiting list is not an exhaustive by any means Once a first audio component is compared with a second audio component and is identified as being within a margin of error, the better audio component selected to be placed in the audio stream. The determination as to which is better can be by identification of the comparative quality of the listening device and upstream electronic components, by the integrity of the audio component, signal to noise ratio, or other ways of an assessment of the accuracy, fidelity, or intelligibility of audio output from an electronic device.

In one or more scenarios, the second signal from the microphone device and/or the first signal from the camera device may be streamed and/or buffered, perhaps for example, separately and/or together. The second signal from the microphone device and/or the first signal from the camera device may be buffered, along with their associated/respective local timestamps, perhaps for example as they are received by the media control device, among other scenarios. The first signal and/or the second signal may be local timestamped, perhaps for example using a similar and/or same clock/clocking mechanism, among other timestamping techniques.

In one or more scenarios, the webcam device and/or the other digital camera device may use standardized/packetized Internet Protocol (IP) streaming protocols/formats such as for example real-time transport protocol (RTP), real time streaming protocol (RTSP), Real-Time Messaging Protocol (RTMP), HyperText Transfer Protocol (HTTP), Dynamic Adaptive Streaming over HTTP (MPEG-DASH), HTTP Dynamic Streaming (HDS), HTTP Live Streaming (HLS), Transmission control Protocol (TCP), User Datagram Protocol (UDP), Moving Picture Experts Group (MPEG), MPEG-TS, MPEG-4 Part 14 (MP4), Audio Visual Interleave (AVI), and/or MOV, and/or the like. In one or more scenarios, the modified first signal may be processed into one or more such protocols/formats in properly synchronized form for transmission to one or more other video conference participants.

In one or more scenarios, the media control device and the at least one recipient device may be at least two devices servicing the video conference. The conference synchronization module 220 may be configured to ascertain a video protocol/format of the video conference (e.g., at some point during the video conference) for one or more of the video conference participants.

In one or more scenarios, the conference synchronization module 220 may be configured to ascertain a buffer size for the first signal with the first timestamp, the first signal with the adjusted first timestamp, the second signal with the first timestamp, and/or the second signal with an adjusted first timestamp, perhaps for example based, at least in part, on the video protocol/format of the video conference.

In one or more scenarios, the conference synchronization module 220 may be configured to provide/assemble/transmit/process the modified first signal in the video protocol/format of the video conference for at least the recipient device, for example.

In one or more scenarios, the conference synchronization module 220 may be configured to derive/ascertain a recording/buffering (e.g., local) timestamp increment for the first signal and/or the second signal, for example.

The routing module 210 can route communications, requests, determinations, and/or detections of video conference audio/video synchronization functions by/for the conference synchronization module 220. For example, the routing module 210 can translate the communications, requests, determinations, and/or detections of video conference audio/video synchronization functions into and/or with an address (e.g., IP address) associated with the conference synchronization module 220. The status detection module 215 may monitor the network connection status of the CPE device 110.

The status detection module 215 may ascertain the status of the network connection for the CPE device 110. The status detection module 215 can monitor the network connection of the CPE device 110 through the network interface 225. The status detection module 215 can monitor one or more various components that are associated with the network connection for the CPE device 110. For example, the status detection module 215 can monitor one or more hardware components (e.g., internal hardware components of the CPE device 110, connection cables such as radio frequency cables, phone lines, and/or digital subscriber lines, etc.) that may be used in the connection of the CPE device 110 to a network. This may include physical status detection (e.g., physical mapping to signal). Perhaps for example if no signal is detected, a physical component may be broken (e.g., broken line or disconnected plug, etc.), among other potential issues. A prompt can instruct a subscriber to check an associated connector and/or line.

The status detection module 215 can monitor the status of the network and/or data link layer(s) associated with the CPE device 110. For example, the status detection module 215 can monitor the CPE device's 110 connection to a host server (e.g., dynamic host configuration protocol server) and/or the status of configuration information received from the host server. For example, the status detection module 215 can monitor the CPE device's 110 connection to a packet routing server (e.g., a point-to-point protocol PPP server) and/or subscriber credentials such as a username and password associated with the packet routing server. Data link layer status may include failed (synchronization failure), connected, on-doing/on-going (synchronizing), and/or others. Perhaps for example in response to a failure, among other scenarios, a re-scan for a cable line and/or retraining for DSL line may be attempted.

The communications, requests, determinations, and/or detections of video conference audio/video synchronization functions may be transmitted and/or stored in one or more files, such as text files (e.g., Hypertext Transfer Protocol (HTTP) files), among other type of files.

The CPE device 110 may store one or more, or multiple, files that may be ordered (e.g., hierarchically according to a specific order) for carrying out one or more actions in the setup of a device (e.g., set-top box 110b). The conference synchronization module 220 may include and/or be in communication with a buffer 235. The buffer 235 can store a subscriber communication (e.g., URL or IP address received from the subscriber) and/or the communications, requests, determinations, and/or detections of video conference audio/video synchronization functions.

In one or more scenarios, perhaps for example when the status detection module 215 may ascertain that a network connection issue might no longer exist, the buffer 235 can output the subscriber communication and/or the communications, requests, determinations, and/or detections of video conference audio/video synchronization functions through the network interface 225.

In one or more scenarios, media content elements of the electronic content may include one or more of over-the-top (OTT) video, cable video, broadcast video, and/or satellite video, among other types of video content.

Figure 3:
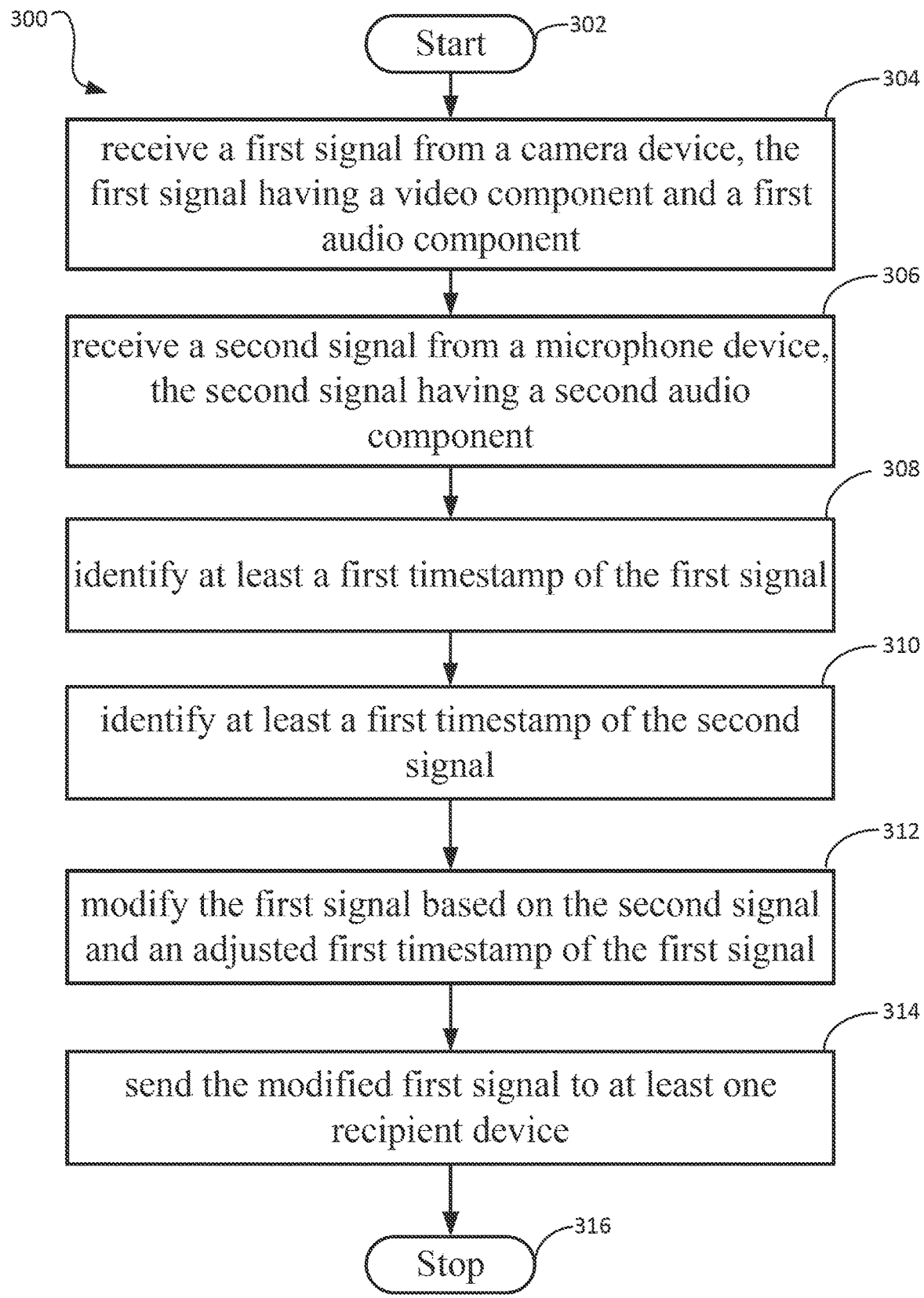
FIG. 3 is an example flow diagram of at least one technique for servicing a video conference.

Referring now to FIG. 3, an example diagram 300 illustrates a technique for servicing a video conference by a media control device, among other devices. For example, the media control device may be a set-top box such as device 110b, among other devices 110a-110d and/or 140a-140i, and/or Internet streaming devices 640 and/or 740, for example. The media control device may be in communication with a camera device and a microphone device via at least one network. The camera device and the microphone device may be different devices. At 302, the process may start or restart. At 304, the media control device may receive a first signal from the camera device. The first signal may include at least a video component and a first audio component.

At 306, the media control device may receive a second signal from the microphone device. The second signal may include at least a second audio component. At 308, the media control device may identify at least a first timestamp of the first signal. At 310 the media control device may identify at least a first timestamp to the second signal.

At 312, the media control device may modify the first signal based, at least in part, on the second signal, an adjusted first timestamp of the first signal, and the first timestamp of the second signal. At 314, the media control device may send the modified first signal to at least one recipient device.

At 316 the process may stop or restart. In one or more scenarios, the media control device may be a set-top box, a mobile device, an Internet streaming device, a television, a personal computing device, a home gateway, and/or a media gateway, among other devices.

FIG. 6 is a diagram of at least one example technique for servicing a video conference that may be performed by one or more of the components of video conference scheme 600. In FIG. 6, Internet streaming device 640 may include one or more microphone devices. The one or more microphone devices may be "high quality" microphone devices such as, or like, microphone device 140f, for example. Internet streaming device 640, and/or its one or more microphones, may be in wired (e.g., high-definition multimedia interface (HDMI), etc.) and/or wireless communication (e.g., Bluetooth™, Wi-Fi™, etc.) with television/monitor 630.

Television/monitor 630 may be the same kind of device, or like, television/monitor 140b. Camera device 610 may be in wired (e.g., high-definition multimedia interface (HDMI), etc.) and/or wireless communication (e.g., Bluetooth™, Wi-Fi™, etc.) with television/monitor 630. Camera device 610 may be in wired and/or wireless (e.g., Bluetooth™ Wi-Fi™, etc.) communication with Internet streaming device 640. In one or more scenarios, camera device 610 may be a webcam device that may be integral to, and/or associated with, television monitor 630. In one or more scenarios, camera device 610 may be a stand-alone digital camera device.

At 602, camera device 610 may capture the video components/packets/communication of the video conference. Camera device's 610 one or more microphones may capture the audio components/packets/communication of the video conference (e.g., a video conference participant's voice and/or other audio communication shared in the video conference). Camera device 610 may send/transmit an output signal to the Internet streaming device 640, for example directly and/or via television/monitor 630 at 606. Camera device's 610 output signal may include a video component corresponding to the video communication of the video conference and an audio component corresponding to the audio communication of the video conference.

The one or more microphones of Internet streaming device 640 may capture the audio communication of a video conference (e.g., a video conference participant's voice and/or other audio communication shared in the video conference). The captured audio communication of Internet streaming device's 640 one or more microphone devices may be a higher quality audio communication capture than the audio communication captured by camera device's 610 one or more microphones.

Internet streaming device 640 may employ one or more of the capabilities, techniques, methods, and/or devices described herein to align/synchronize the audio component of the camera device's 610 output signal with the audio component captured by Internet streaming device's 640 one or more microphones. Internet streaming device 640 may buffer the video component and/or the output signal of camera device's 610. Internet streaming device 640 may replace/substitute the audio component of camera device's 610 output signal with the aligned/synchronized audio component provided by Internet streaming device's 640 one or more microphones. Internet streaming device 640 may provide the modified camera device's 610 output signal, for example from the buffer, to one or more other (e.g., recipient) devices (e.g., via a network, Internet, etc.) that may be servicing the video conference.

FIG. 7 is a diagram of at least one example technique for servicing a video conference that may be performed by one or more of the components of video conference scheme 700. In FIG. 7, microphone device 750 may be a "high quality" microphone device such as, or like, microphone device 140f, for example. Microphone device 750 may be in wired and/or wireless communication (e.g., Bluetooth™, Wi-Fi™, etc.) with Internet streaming device 740. Internet streaming device 740 may be in wired (e.g., high-definition multimedia interface (HDMI), etc.) and/or wireless communication (e.g., Bluetooth™, Wi-Fi™, etc.) with television/monitor 730.

Television/monitor 730 may be the same kind of device, or like, television/monitor 140b. Camera device 710 may be in wired (e.g., high-definition multimedia interface (HDMI), etc.) and/or wireless communication (e.g., Bluetooth™, Wi-Fi™, etc.) with television/monitor 730. Camera device 710 may be in wired and/or wireless (e.g., Bluetooth™ Wi-Fi™, etc.) communication with Internet streaming device 740. In one or more scenarios, camera device 710 may be a webcam device that may be integral to, and/or associated with, television monitor 730. In one or more scenarios, camera device 710 may be a stand-alone digital camera device.

At 702, camera device 710 may capture the video components/packets/communication of the video conference. Camera device's 710 one or more microphones may capture the audio components/packets/communication of the video conference (e.g., a video conference participant's voice and/or other audio communication shared in the video conference). Camera device 710 may send/transmit an output signal to the Internet streaming device 740, for example directly and/or via television/monitor 730 at 706. Camera device's 710 output signal may include a video component corresponding to the video communication of the video conference and an audio component corresponding to the audio communication of the video conference.

At 704, microphone device 750 may capture the audio components/packets/communication of the video conference (e.g., a video conference participant's voice and/or other audio communication shared in the video conference). The captured audio communication of microphone device 750 may be a higher quality audio communication capture than the audio communication captured by camera device's 710 one or more microphones. Microphone device 750 may send a signal/packets/components representing the captured audio communication to Internet streaming device 740.

Internet streaming device 740 may employ one or more of the capabilities, techniques, methods, and/or devices described herein to align/synchronize the audio component of the camera device's 710 output signal with the audio component captured by microphone device 750. Internet streaming device 740 may buffer the video component and/or the output signal of camera device's 710. Internet streaming device 740 may replace/substitute the audio component of camera device's 710 output signal with the aligned/synchronized audio component provided by microphone device 750. Internet streaming device 740 may provide the modified camera device's 710 output signal, for example from the buffer, to one or more other (e.g., recipient) devices (e.g., via a network, Internet, etc.) that may be servicing the video conference.

Figure 4:
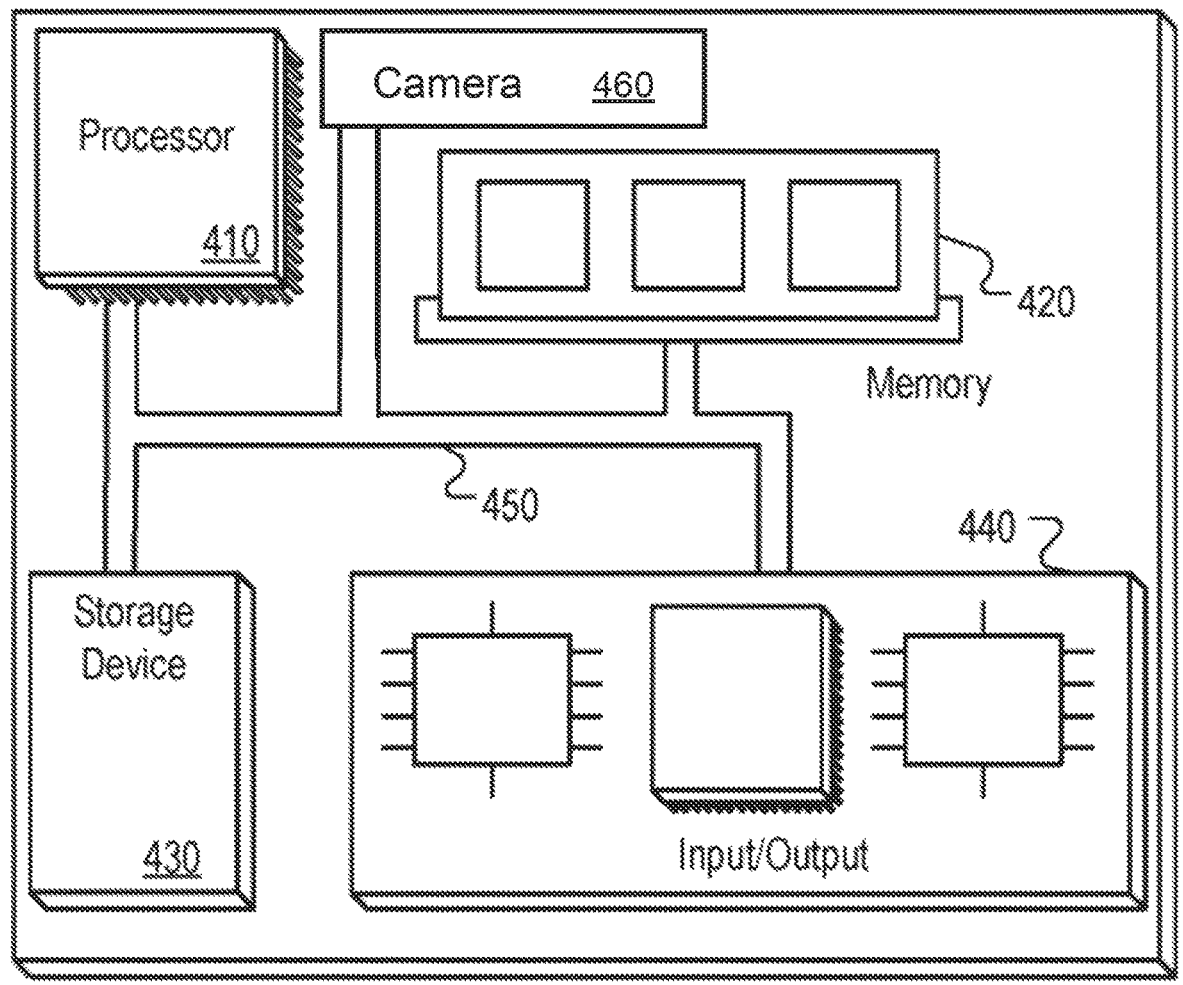
FIG. 4 is a block diagram of a hardware configuration of an example device that may deliver electronic content, such as the CPE device of FIG. 2.

FIG. 4 is a block diagram of a hardware configuration of an example device that may deliver electronic content/media content (e.g., video and/or audio content/components of electronic content), such as the CPE device 110 of FIG. 2, among other devices such as 140a-140i, devices 110a-110d, and/or devices 640 of FIG. 6 and/or 740 of FIG. 7, for example. The hardware configuration 400 may be operable to facilitate delivery of information from an internal server of a device. The hardware configuration 400 can include a processor 410, a memory 420, a storage device 430, and/or an input/output device 440. One or more of the components 410, 420, 430, and 440 can, for example, be interconnected using a system bus 450. The processor 410 can process instructions for execution within the hardware configuration 400. The processor 410 can be a single-threaded processor or the processor 410 can be a multi-threaded processor. The processor 410 can be capable of processing instructions stored in the memory 420 and/or on the storage device 430.

The memory 420 can store information within the hardware configuration 400. The memory 420 can be a computer-readable medium (CRM), for example, a non-transitory CRM. The memory 420 can be a volatile memory unit, and/or can be a non-volatile memory unit.

The storage device 430 can be capable of providing mass storage for the hardware configuration 400. The storage device 430 can be a computer-readable medium (CRM), for example, a non-transitory CRM. The storage device 430 can, for example, include a hard disk device, an optical disk device, flash memory and/or some other large capacity storage device. The storage device 430 can be a device external to the hardware configuration 400.

The input/output device 440 may provide input/output operations for the hardware configuration 400. The input/output device 440 (e.g., a transceiver device) can include one or more of a network interface device (e.g., an Ethernet card), a serial communication device (e.g., an RS-232 port), one or more universal serial bus (USB) interfaces (e.g., a USB 2.0 port) and/or a wireless interface device (e.g., an 802.11 card). The input/output device can include driver devices configured to send communications to, and/or receive communications from one or more networks (e.g., subscriber network 120 of FIG. 1).

The camera device 460 may provide digital video input/output capability for the hardware configuration 400. The camera device 460 may communicate with any of the elements of the hardware configuration 400, perhaps for example via system bus 450. The camera device 460 may capture digital images and/or may scan images of various kinds, such as Universal Product Code (UPC) codes and/or Quick Response (QR) codes, for example, among other images.

The camera device 460 may include at least one microphone devices and/or at least one speaker device. The input/output of the camera device 460 may include audio signals/packets/components, perhaps for example separate/separable from, or in some (e.g., separable) combination with, the video signals/packets/components the camera device 460.

The camera device 460 may also detect the presence of one or more people that may be proximate to the camera device 460 and/or may be in the same general space (e.g., the same room) as the camera device 460. The camera device 460 may gauge a general activity level (e.g., high activity, medium activity, and/or low activity) of one or more people that may be detected by the camera device 460. The camera device 460 may detect one or more general characteristics (e.g. height, body shape, skin color, pulse, heart rate, breathing count, etc.) of the one or more people detected by the camera device 460. The camera device 460 may be configured to recognize one or more specific people, for example.

The camera device 460 may be in wired and/or wireless communication with the hardware configuration 400. In one or more scenarios, the camera device 460 may be external to the hardware configuration 400. In one or more scenarios, the camera device 460 may be internal to the hardware configuration 400.

Figure 5:
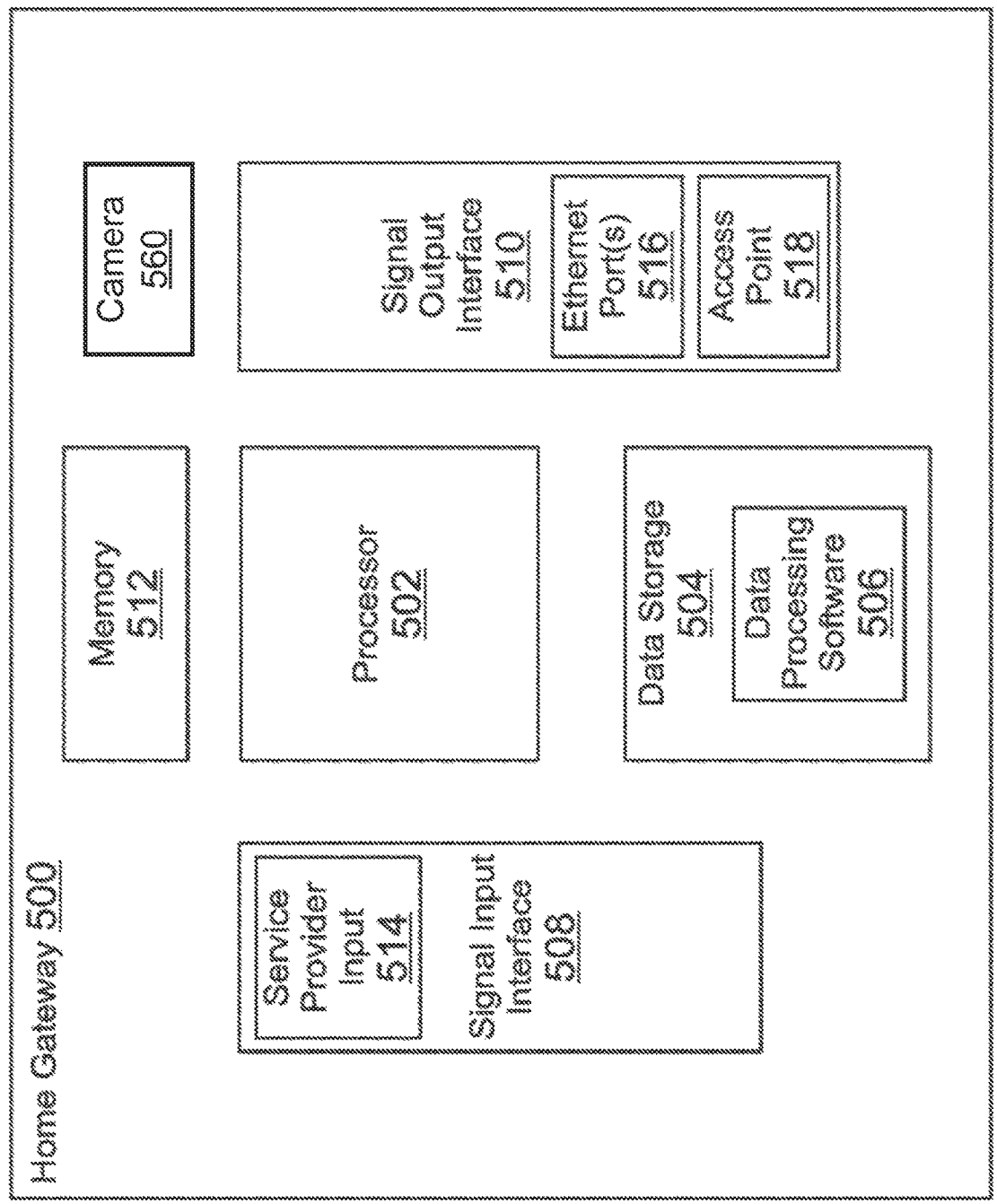
FIG. 5 is a block diagram of a hardware configuration of an example device that may deliver electronic content, such as a home gateway.

FIG. 5 is a block diagram of a hardware configuration of an example device that may deliver electronic content/media content (e.g., video and/or audio components of electronic content), such as a home gateway (e.g., an access point device), among other devices. A hardware configuration 500 (e.g., home gateway 500) may be constructed in a similar manner to hardware configuration 400 in that the architecture may be built around a general-purpose processor, processor 502, and/or an application specific chip set such as designed for use in a Data Over Cable Service Interface Specification (DOCSIS), a Gigabit Passive Optical Network (GPON), and/or a Digital Subscriber Line (DSL) modem. As with processor 402, the general-purpose processor 502 may also be an off-the-shelf processor. The functionality of the desired modem may be implemented through data processing software 506 stored in data storage 504 and/or may be run on processor 502.

Home gateway 500 may include signal input interface 508 and/or signal output interface 510. Signal input interface 508 may include, for example, circuitry to receive data input from a service provider at service provider input 514, e.g., a cable and/or a fiber optic input.

Signal output interface 510 may provide the output of the home gateway 500. Signal output interface 510 may provide signals in formats for transmission over a datalink. For example, interface 510 may include one or more Ethernet ports 516 and/or a wireless access point 518. Data may be communicated over wired and/or wireless networks. The access point 518 may be located external to the home gateway 500. Video and/or audio content received at signal input interface 508 can be streamed from home gateway 500 to hardware configuration 400, perhaps for example as another source of video and/or audio signal. This streaming may be accomplished over a reliable backhaul communication link (not shown) that may provide good video quality, perhaps for example for signals that are sensitive to latency in the signal (e.g., live programming). The signal input interface 508 and the signal output interface 510 may operate together, such as for example as a transceiver device.

In operation, a data signal may be received at signal input interface 508 of home gateway 500. Processor 502 may operate data processing software 506 on general-purpose processor 502 to prepare the received signals (e.g., code, decode, etc.). The output of the data processing software 506 may be output by signal output interface 510, e.g., Ethernet port 516 and/or wireless access point 518.

The camera device 560 may provide digital video input/output capability for the home gateway 500. The camera device 560 may communicate with any of the elements of the home gateway 500. The camera device 560 may capture digital images and/or may scan images of various kinds, such as Universal Product Code (UPC) codes and/or Quick Response (QR) codes, for example, among other images.

The camera device 560 may include at least one microphone devices and/or at least one speaker device. The input/output of the camera device 560 may include audio signals/packets/components, perhaps for example separate/separable from, or in some (e.g., separable) combination with, the video signals/packets/components the camera device 560.

The camera device 560 may also detect the presence of one or more people that may be proximate to the camera device 560 and/or may be in the same general space (e.g., the same room) as the camera device 560. The camera device 560 may gauge a general activity level (e.g., high activity, medium activity, and/or low activity) of one or more people that may be detected by the camera device 560. The camera device 560 may detect one or more general characteristics (e.g. height, body shape, skin color, pulse, heart rate, breathing count, etc.) of the one or more people detected by the camera device 560. The camera device 560 may be configured to recognize one or more specific people, for example.

The camera device 560 may be in wired and/or wireless communication with the home gateway 500. In one or more scenarios, the camera device 560 may be external to the home gateway 500. In one or more scenarios, the camera device 560 may be internal to the home gateway 500.

Those skilled in the art will appreciate that the disclosed subject matter improves upon methods and/or apparatuses for servicing a video conference. For example, the video component of a camera device's audio/visual output signal may be aligned/synchronized with the audio component of a microphone's audio output signal so that the video conference participants may monitor the video output of the camera device along with the audio output of the microphone device. This may be useful in one or more scenarios, perhaps for example where a video conference participant may wish to use a higher quality microphone for the video conference relative to the quality of one or more microphones that may be part of a webcam or other digital camera used to convey the video component of the video conference.

The subject matter of this disclosure, and components thereof, can be realized by instructions that upon execution cause one or more processing devices to carry out the processes and/or functions described herein. Such instructions can, for example, comprise interpreted instructions, such as script instructions, e.g., JavaScript or ECMAScript instructions, or executable code, and/or other instructions stored in a computer readable medium.

Implementations of the subject matter and/or the functional operations described in this specification and/or the accompanying figures can be provided in digital electronic circuitry, in computer software, firmware, and/or hardware, including the structures disclosed in this specification and their structural equivalents, and/or in combinations of one or more of them. The subject matter described in this specification can be implemented as one or more computer program products, e.g., one or more modules of computer program instructions encoded on a tangible program carrier for execution by, and/or to control the operation of, data processing apparatus.

A computer program (also known as a program, software, software application, script, or code) can be written in any form of programming language, including compiled or interpreted languages, and/or declarative or procedural languages. It can be deployed in any form, including as a stand-alone program or as a module, component, subroutine, and/or other unit suitable for use in a computing environment. A computer program may or might not correspond to a file in a file system. A program can be stored in a portion of a file that holds other programs and/or data (e.g., one or more scripts stored in a markup language document), in a single file dedicated to the program in question, and/or in multiple coordinated files (e.g., files that store one or more modules, sub programs, or portions of code). A computer program can be deployed to be executed on one computer or on multiple computers that may be located at one site or distributed across multiple sites and/or interconnected by a communication network.

The processes and/or logic flows described in this specification and/or in the accompanying figures may be performed by one or more programmable processors executing one or more computer programs to perform functions by operating on input data and/or generating output, thereby tying the process to a particular machine (e.g., a machine programmed to perform the processes described herein). The processes and/or logic flows can also be performed by, and apparatus can also be implemented as, special purpose logic circuitry, e.g., an FPGA (field programmable gate array) and/or an ASIC (application specific integrated circuit).

Computer readable media suitable for storing computer program instructions and/or data may include all forms of non-volatile memory, media and memory devices, including by way of example semiconductor memory devices (e.g., EPROM, EEPROM, and/or flash memory devices); magnetic disks (e.g., internal hard disks or removable disks); magneto optical disks; and/or CD ROM and DVD ROM disks. The processor and/or the memory can be supplemented by, or incorporated in, special purpose logic circuitry.

While this specification and the accompanying figures contain many specific implementation details, these should not be construed as limitations on the scope of any invention and/or of what may be claimed, but rather as descriptions of features that may be specific to described example implementations. Certain features that are described in this specification in the context of separate implementations can also be implemented in combination in perhaps one implementation. Various features that are described in the context of perhaps one implementation can also be implemented in multiple combinations separately or in any suitable subcombination. Although features may be described above as acting in certain combinations and/or perhaps even (e.g., initially) claimed as such, one or more features from a claimed combination can in some cases be excised from the combination. The claimed combination may be directed to a sub-combination and/or variation of a sub-combination.

While operations may be depicted in the drawings in an order, this should not be understood as requiring that such operations be performed in the particular order shown and/or in sequential order, and/or that all illustrated operations be performed, to achieve useful outcomes. The described program components and/or systems can generally be integrated together in a single software product and/or packaged into multiple software products.

Examples of the subject matter described in this specification have been described. The actions recited in the claims can be performed in a different order and still achieve useful outcomes, unless expressly noted otherwise. For example, the processes depicted in the accompanying figures do not require the particular order shown, and/or sequential order, to achieve useful outcomes. Multitasking and parallel processing may be advantageous in one or more scenarios.

While the present disclosure has been illustrated and described in detail in the drawings and foregoing description, the same is to be considered as illustrative and not restrictive in character, it being understood that only certain examples have been shown and described, and that all changes and modifications that come within the spirit of the present disclosure are desired to be protected.

What is claimed is:

1. A method for servicing a video conference performed by a media control device, the method comprising:
  receiving, by the media control device, a first signal including a first audio component from a first device, the first audio component representing at least some audio communication of a video conference;
  receiving, by the media control device, a second signal including a second audio component from a second device, the second audio component representing the at least some audio communication of the video conference;

identifying, by the media control device, at least a first timestamp of the first signal;

identifying, by the media control device, at least a first timestamp of the second signal;

assigning, by the media control device, a common timestamp to the first signal and the second signal;

modifying, by the media control device, the first signal and/or the second signal based, at least in part, on the common timestamp; and sending, by the media control device, the modified first signal and/or the modified second signal to at least one recipient device.

2. The method of claim 1, wherein the assigning of the common timestamp comprises:

measuring, by the media control device, a network transmission time of communication on the network between the media control device and the first device and/or the second device; and calculating, by the media control device, an average of the network transmission time over at least one time period.

3. The method of claim 2, wherein the modifying further comprises:

ascertaining, by the media control device, an adjustment time for the first signal and/or the second signal, the adjustment time being a difference between the first timestamp of the first signal and the average of the network transmission time and/or a difference between the first timestamp of the second signal and the average of the network transmission time;

adjusting, by the media control device, at least the first timestamp of the first signal and/or the first timestamp of the second signal based on the adjustment time; and buffering, by the media control device, at least the first signal and/or the second signal with the respective adjusted first timestamp.

4. The method of claim 3, further comprising:

replacing, by the media control device, the first audio component with the second audio component in the buffered first signal with the adjusted first timestamp, based, at least in part, on at least one of: the first timestamp of the second signal, or an adjusted first timestamp of the second signal.

5. The method of claim 3, further comprising:

sampling, by the media control device, the first audio component;

comparing, by the media control device, the first audio component with the second audio component based, at least in part, on the sampling;

aligning, by the media control device, the second audio component with the first audio component based, at least in part, on the comparing; and replacing, by the media control device, the first audio component with the aligned second audio component in the buffered first signal with the adjusted first timestamp, based, at least in part, on at least one of: the first timestamp of the second signal, or an adjusted first timestamp of the second signal.

6. The method of claim 3, further comprising:

replacing, by the media control device, the second audio component with the first audio component in the buffered second signal with the adjusted first timestamp, based, at least in part, on at least one of: the first timestamp of the first signal, or an adjusted first timestamp of the first signal.

7. The method of claim 3, further comprising:

sampling, by the media control device, the second audio component;

comparing, by the media control device, the second audio component with the first audio component based, at least in part, on the sampling;

aligning, by the media control device, the first audio component with the second audio component based, at least in part, on the comparing; and replacing, by the media control device, the second audio component with the aligned second first component in the buffered second signal with the adjusted first timestamp, based, at least in part, on at least one of: the first timestamp of the first signal, or an adjusted first timestamp of the first signal.

8. The method of claim 1, wherein the media control device is at least one of: a set-top box, a home gateway, an Internet streaming device, a mobile device, a media gateway, a television, or a personal computing device; and wherein the first device and/or the second device is a camera device and/or a microphone device.

9. A media control device configured to service a video conference, the media control device comprising:

a memory;

a transceiver, the transceiver configured to communicate with at least a first device and a second device via at least one network; and a processor, the processor configured at least to:

receive a first signal from the first device, the first signal including a first audio component, the first audio component representing at least some audio communication of the video conference;

receive a second signal from the second device, the second signal including at least a second audio component, the second audio component representing the at least some audio communication of the video conference;

identify at least a first timestamp of the first signal;

identify at least a first timestamp of the second signal;

assign a common timestamp to the first signal and the second signal;

perform a modification on the first signal and/or the second signal based, at least in part, on the common timestamp; and send the modified first signal and/or the modified second signal to at least one recipient device.

10. The media control device of claim 9, wherein the assigning of the common timestamp comprises:

measure a network transmission time of communication on the network between the media control device and the first device and/or the second device; and calculate an average of the network transmission time over at least one time period.

11. The media control device of claim 10, wherein for the modification on the first signal and/or the second signal, the processor is further configured to:

ascertain an adjustment time for the first signal, the adjustment time being a difference between the first timestamp of the first signal and the average of the network transmission time and/or a difference between the first timestamp of the second signal and the average of the network transmission time;

adjust at least the first timestamp of the first signal and/or the first timestamp of the second signal based on the adjustment time; and buffer at least the first signal and/or the second signal with the respective adjusted first timestamp.

12. The media control device of claim 11, wherein the processor is further configured to:

replace the first audio component with the second audio component in the buffered first signal with the adjusted first timestamp, based, at least in part, on at least one of: the first timestamp of the second signal, or an adjusted first timestamp of the second signal.

13. The media control device of claim 11, wherein for the modification on the first signal, the processor is further configured to:

sample the first audio component;

perform a comparison of the first audio component with the second audio component based, at least in part, on the sample;

align the second audio component with the first audio component based, at least in part, on the comparison; and replace the first audio component with the aligned second audio component in the buffered first signal with the adjusted first timestamp, based, at least in part, on at least one of: the first timestamp of the second signal, or an adjusted first timestamp of the second signal.

14. The media control device of claim 11, wherein the processor is further configured to:

replace the second audio component with the first audio component in the buffered second signal with the adjusted first timestamp, based, at least in part, on at least one of: the first timestamp of the first signal, or an adjusted first timestamp of the first signal.

15. The media control device of claim 11, wherein for the modification on the second signal, the processor is further configured to:

sample the second audio component;

perform a comparison of the second audio component with the first audio component based, at least in part, on the sample;

align the first audio component with the second audio component based, at least in part, on the comparison; and replace the second audio component with the aligned first audio component in the buffered second signal with the adjusted first timestamp, based, at least in part, on at least one of: the first timestamp of the first signal, or an adjusted first timestamp of the first signal.

16. The media control device of claim 9, wherein the media control device is at least one of: a set-top box, a home gateway, a media gateway, an Internet streaming device, a mobile device, a television, or a personal computing device; and wherein the first device and/or the second device is a camera device and/or a microphone device.

17. A non-transitory computer readable medium having instructions stored thereon, the instructions causing at least one processor of a media control device to perform one or more operations comprising at least:

receiving a first signal from camera first device, the first signal including at least a first audio component, the first audio component representing at least some audio communication of a video conference;

receiving a second signal from a second device, the second signal including at least a second audio component, the second audio component representing the at least some audio communication of the video conference;

identifying at least a first timestamp of the first signal;

identifying at least a first timestamp of the second signal;

assigning a common timestamp to the first signal and the second signal;

modifying the first signal based and/or the second signal, at least in part, on the common timestamp; and sending the modified first signal and/or the modified second signal to at least one recipient device.

18. The non-transitory computer readable medium of claim 17, wherein the one or more operations further comprise:

measuring a network transmission time of communication on the network between the media control device and the camera device and/or the second device; and calculating an average of the network transmission time over at least one time period.

19. The non-transitory computer readable medium of claim 18, wherein the one or more operations for the modifying further comprises:

ascertaining an adjustment time for the first signal, the adjustment time being a difference between the first timestamp of the first signal and the average of the network transmission time and/or the first timestamp of the second signal and the average of the network transmission time;

adjusting at least the first timestamp of the first signal and/or the first timestamp of the second signal based on the adjustment time; and buffering at least the first signal and/or the second signal with the respective adjusted first timestamp.

20. The non-transitory computer readable medium of claim 19, wherein the one or more operations further comprise:

replacing the first audio component with the second audio component in the buffered first signal with the adjusted first timestamp, based, at least in part, on at least one of: the first timestamp of the second signal, or an adjusted first timestamp of the second signal.

21. The non-transitory computer readable medium of claim 19, wherein the one or more operations further comprise:

sampling the first audio component;

comparing the first audio component with the second audio component based, at least in part, on the sampling;

aligning the second audio component with the first audio component based, at least in part, on the comparing; and replacing the first audio component with the aligned second audio component in the buffered first signal with the adjusted first timestamp, based, at least in part, on at least one of: the first timestamp of the second signal, or an adjusted first timestamp of the second signal.

22. The non-transitory computer readable medium of claim 19, wherein the one or more operations further comprise:

replacing the second audio component with the first audio component in the buffered second signal with the adjusted first timestamp, based, at least in part, on at least one of: the first timestamp of the first signal, or an adjusted first timestamp of the first signal.

23. The non-transitory computer readable medium of claim 19, wherein the one or more operations further comprise:
- sampling the second audio component;
- comparing the second audio component with the first audio component based, at least in part, on the sampling;
- aligning the first audio component with the second audio component based, at least in part, on the comparing; and
- replacing the second audio component with the aligned first audio component in the buffered second signal with the adjusted first timestamp, based, at least in part, on at least one of: the first timestamp of the first signal, or an adjusted first timestamp of the first signal.

24. The non-transitory computer readable medium of claim 17, wherein the media control device is at least one of: a set-top box, a home gateway, a media gateway, an Internet streaming device, a mobile device, a television, or a personal computing device; and wherein the first device and/or the second device is a camera device and/or a microphone device.

\* \* \* \* \*